(12) United States Patent
Kasahara

(10) Patent No.: US 10,284,583 B2
(45) Date of Patent: May 7, 2019

(54) INFORMATION PROCESSING SYSTEM, INFORMATION PROCESSING APPARATUS, AND INFORMATION PROCESSING METHOD

(71) Applicant: Ryosuke Kasahara, Kanagawa (JP)

(72) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 14/874,536

(22) Filed: Oct. 5, 2015

(65) Prior Publication Data

US 2016/0127405 A1 May 5, 2016

(30) Foreign Application Priority Data

Oct. 29, 2014 (JP) .................................. 2014-219946

(51) Int. Cl.
| | |
|---|---|
| H04L 29/06 | (2006.01) |
| G06F 17/16 | (2006.01) |
| G06N 3/08 | (2006.01) |
| G06N 3/04 | (2006.01) |

(52) U.S. Cl.
CPC .......... *H04L 63/1425* (2013.01); *G06F 17/16* (2013.01); *G06N 3/0454* (2013.01); *G06N 3/084* (2013.01)

(58) Field of Classification Search
CPC ....... H04L 63/1425; G06F 17/16; G06N 3/08; G06N 3/084; G06N 3/088
USPC .......................................................... 726/23
See application file for complete search history.

(56) References Cited

U.S. PATENT DOCUMENTS

| | | | | |
|---|---|---|---|---|
| 5,689,346 A | * | 11/1997 | Noda | G06F 17/147 348/248 |
| 6,026,358 A | | 2/2000 | Tomabechi | |
| 6,304,775 B1 | * | 10/2001 | Iasemidis | A61B 5/4094 600/544 |

(Continued)

FOREIGN PATENT DOCUMENTS

| | | |
|---|---|---|
| EP | 2889806 | 7/2015 |
| JP | H08-227410 | 9/1996 |

(Continued)

OTHER PUBLICATIONS

Breunig et al., "LOF: Identifying Density-Based Local Outliers", Proc. ACM SIGMOD 2000 Int. Conf. on Management of Data, Dalles, TX, USA—May 15-18, 2000 (Year: 2000).*

(Continued)

*Primary Examiner* — Eric W Shepperd
*Assistant Examiner* — Peiliang Pan
(74) *Attorney, Agent, or Firm* — IPUSA, PLLC

(57) ABSTRACT

An information processing system, having one or more information processing apparatuses, includes a data input unit configured to take as input first data being multidimensional; a dimension reduction unit configured to generate, based on the first data, second data representing a characteristic of the first data, the second data having a prescribed number of dimensions fewer than a number of dimensions of the first data; and a distinguishing unit configured to distinguish whether the first data is normal data or abnormal data by a semi-supervised anomaly detection, based on the first data and the second data.

12 Claims, 7 Drawing Sheets

(56) References Cited

U.S. PATENT DOCUMENTS

| | | | |
|---|---|---|---|
| 6,525,875 B1* | 2/2003 | Lauer | G03H 1/0443 359/368 |
| 6,683,695 B1* | 1/2004 | Simpson | G01N 21/8422 356/445 |
| 6,768,324 B1* | 7/2004 | Yamada | G01R 31/307 324/754.22 |
| 7,978,090 B2* | 7/2011 | Brooks | G08B 13/10 323/904 |
| 8,346,691 B1* | 1/2013 | Subramanian | G06N 3/08 706/12 |
| 8,544,087 B1* | 9/2013 | Eskin | G06F 21/552 726/22 |
| 8,937,617 B1* | 1/2015 | Mudure | G06T 15/20 345/419 |
| 9,946,165 B2* | 4/2018 | Ypma | G03F 7/70616 |
| 2004/0122335 A1* | 6/2004 | Sackellares | A61B 5/04008 600/544 |
| 2004/0127810 A1* | 7/2004 | Sackellares | A61B 5/04008 600/544 |
| 2004/0218919 A1* | 11/2004 | Hunsche | H04B 10/07953 398/27 |
| 2004/0220837 A1* | 11/2004 | Bonissone | G06Q 40/00 705/4 |
| 2006/0287607 A1* | 12/2006 | Sackellares | G05B 23/024 600/544 |
| 2008/0084553 A1* | 4/2008 | Neiss | G01J 3/28 356/51 |
| 2008/0225051 A1* | 9/2008 | Yamauchi | G06T 17/10 345/426 |
| 2011/0158542 A1* | 6/2011 | Kato | G06K 9/00281 382/195 |
| 2012/0166142 A1* | 6/2012 | Maeda | G05B 23/0227 702/185 |
| 2014/0011748 A1* | 1/2014 | Chin | H01L 29/785 514/19.3 |
| 2014/0235562 A1* | 8/2014 | Palczewski | A61K 31/165 514/46 |
| 2015/0058982 A1* | 2/2015 | Eskin | H04L 63/1425 726/23 |
| 2015/0112182 A1* | 4/2015 | Sharma | A61B 5/0261 600/408 |
| 2015/0324655 A1* | 11/2015 | Chalasani | G06K 9/6272 382/103 |
| 2016/0055190 A1* | 2/2016 | Bar-Yam | G06F 17/30572 707/693 |
| 2016/0070709 A1* | 3/2016 | Luan | G06Q 30/0282 707/728 |
| 2016/0093048 A1* | 3/2016 | Cheng | G06T 7/30 382/131 |

FOREIGN PATENT DOCUMENTS

| | | |
|---|---|---|
| JP | 2010-140444 | 6/2010 |
| JP | 2014-026455 | 2/2014 |
| JP | 2015-128228 | 7/2015 |

OTHER PUBLICATIONS

Dongil Kim et al: "Machine learning-based novelty detection for faulty wafer detection in semiconductor manufacturing", Expert Systems With Applications, vol. 39, No. 4, Mar. 1, 2012 (Mar. 1, 2012), pp. 4075-4083, XP028125532, ISSN: 0957-4174, DOI: 10.1016/J. ESWA. 2011.09.088 [retrieved on Sep. 29, 2011] * the whole document *.

Wulsin D F et al: "Modeling electroencephalography waveforms with semi-supervised deep belief nets: fast classification and anomaly measurement; Modeling EEG waveforms with semi-supervised deep belief nets", Journal of Neural Engineering, Institute of Physics Publishing, Bristol, GB, vol. 8, No. 3, Apr. 28, 2011 (Apr. 28, 2011), p. 36015, XP020205975, ISSN: 1741-2552, DOI: 10.1088/1741-2560/8/3/036015 * p. 1-p. 5 *.

Varun Chandola et al: "Anomaly detection", ACM Computing Surveys, vol. 41, No. 3, Jul. 1, 2009 (Jul. 1, 2009), pp. 1-58, XP055217605, ISSN: 0360-0300, DOI: 101145/1541880. 1541882 * the whole document *.

Matteoli S et al: "A tutorial overview of anomaly detection in hyperspectral images", IEEE Aerospace and Electronic Systems Magazine, IEEE Service Center, Piscataway, NJ, US, vol. 25, No. 7, May 22, 2009 (May 22, 2009), pp. 5-28, XP011316490, ISSN: 0885-8985 * the whole document *.

Extended European Search Report dated Mar. 22, 2016.

H.H Yue et al: "Fault detection of plasma etchers using optical emission spectra", IEEE Transactions on Semiconductor Manufacturing, Aug. 1, 2000 (Aug. 1, 2000), pp. 374-385, XP055497840, New York DOI: 10.1109/66.857948 Retrieved from the Internet: URL:https://ieeexplore.ieee.org/ielx5/66/18640/00857948.pdf?tp=&arnumber=857948&isnumber=18640.

Qin S J et al: "Semiconductor manufacturing process control and monitoring: A fab-wide framework", Journal of Process Control, Oxford, GB, vol. 16, No. 3, Mar. 1, 2006 (Mar. 1, 2006), pp. 179-191, XP024963554, ISSN: 0959-1524, DOI: 10.1016/J.JPROCONT.2005.06.002 [retrieved on Mar. 1, 2006].

Office Action dated Aug. 16, 2018 issued with respect to the corresponding European Patent Application No. 15189291.6.

Japanese Office Action for 2014-219946 dated Oct. 16, 2018.

"Effective learning for successive TFC" Y. Matsuo, T. Kobayashi, H. Takauji, S. Kaneko Hokkaido University, Nippon Steel Corporation Jun. 9, 2010.

"A method to improve the performance of auto-associative memory for face recognition" Hiroshi Kage Advanced Technology R&D Center, Mitsubishi Electric Corporation Mar. 10, 2014.

* cited by examiner

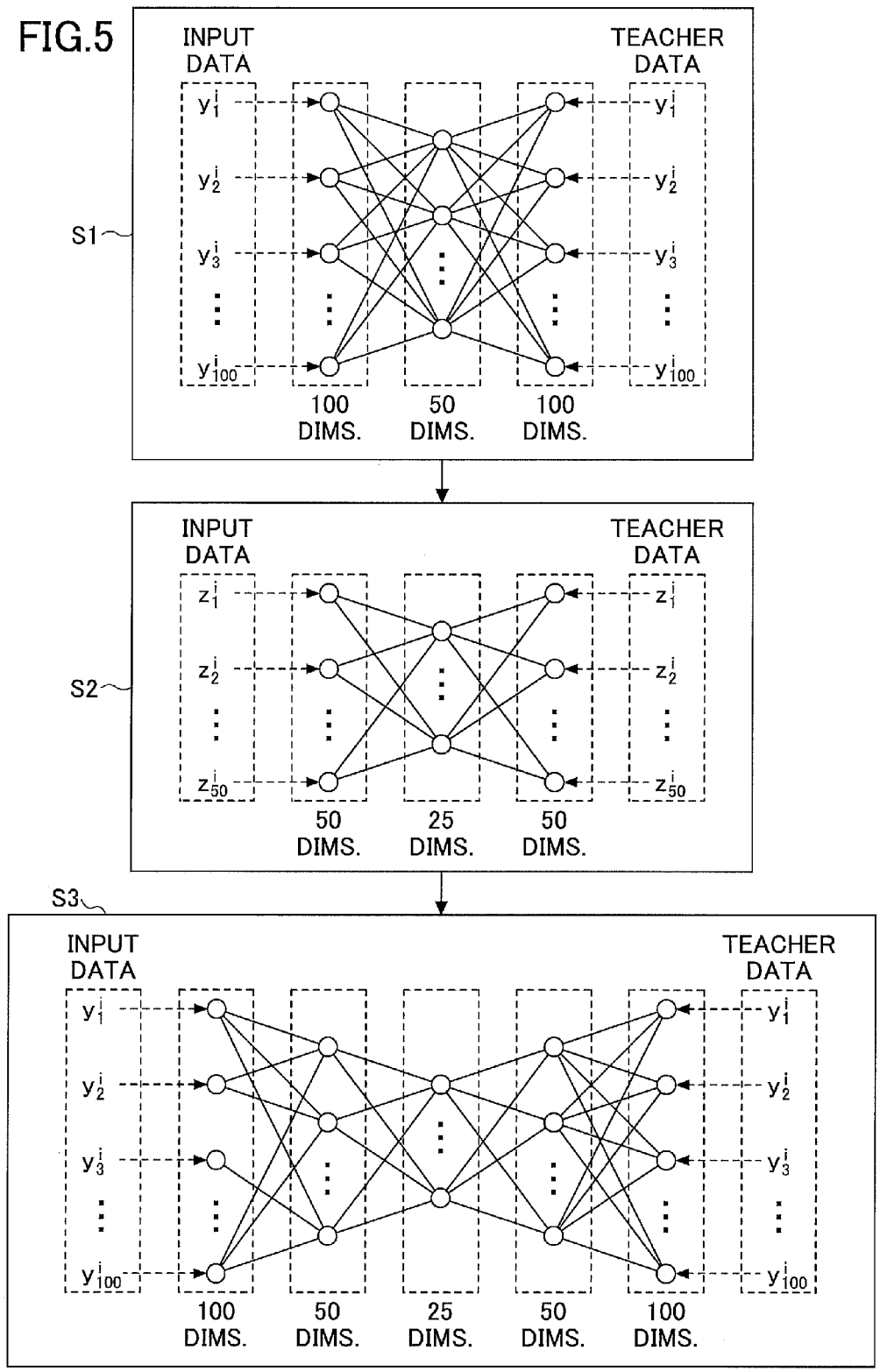

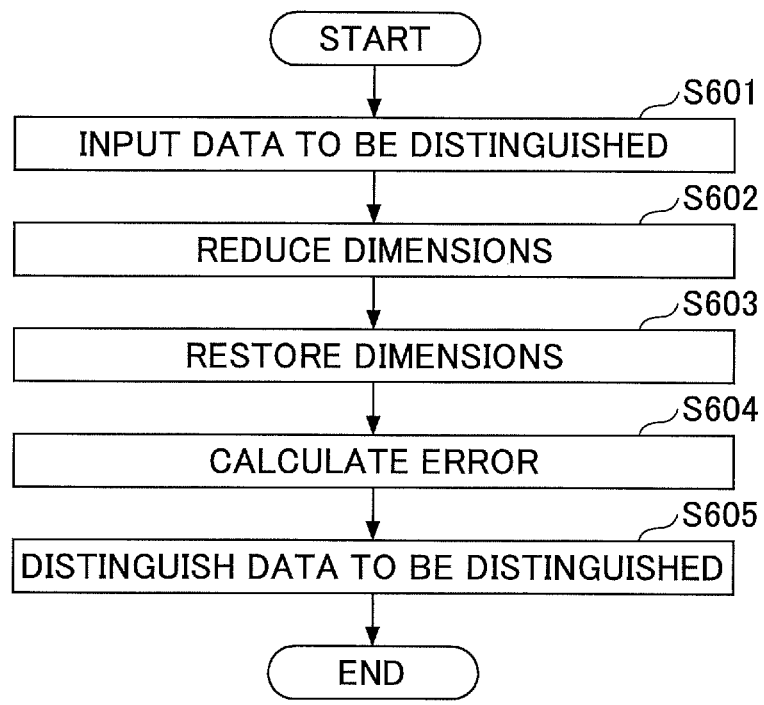

INFORMATION PROCESSING SYSTEM, INFORMATION PROCESSING APPARATUS, AND INFORMATION PROCESSING METHOD

BACKGROUND OF THE INVENTION

1. Field of the Invention

The disclosures herein generally relate to an information processing system, an information processing apparatus, and an information processing method.

2. Description of the Related Art

Conventionally, a method of machine learning has been known that distinguishes whether data represents an abnormal value (an outlier), and a technology has been known that detects, for example, an irregular product and a defective product by using such a method. Methods of distinguishing whether data represents an abnormal value are generally classified into three methods of the supervised anomaly detection method, the semi-supervised anomaly detection method, and the unsupervised anomaly detection method.

Here, a conventional technology has been known that classifies (distinguishes) input data, by using a supervised anomaly detection method in a circumstance where a sufficient amount of learning data cannot be not obtained (see, for example, Patent Document 1).

However, since the conventional technology uses a supervised anomaly detection method, there may be a problem in that precision may be low for a distinguished result if it is difficult to obtain data that represents an abnormal value as learning data. Namely, for example, as learning data for distinguishing certain products, if a considerable amount of data can be obtained that represents normal values, but data that represents abnormal values can be hardly obtained, precision may be low for the distinguished result because learning has not been sufficiently executed for data that represents abnormal values.

On the other hand, the semi-supervised anomaly detection method is a method that uses data that represents normal values as learning data, by which it is often the case that precision of a distinguished result is lower compared to the supervised anomaly detection method in general, yet it has an advantage that an unexpected abnormal value can be detected.

In view of the above, it is a general object of at least one embodiment of the present invention to distinguish data with high precision, by using the semi-supervised anomaly detection method.

SUMMARY OF THE INVENTION

According to an embodiment of the present invention, an information processing system, having one or more information processing apparatuses, includes a data input unit configured to take as input first data being multidimensional; a dimension reduction unit configured to generate, based on the first data, second data representing a characteristic of the first data, the second data having a prescribed number of dimensions fewer than a number of dimensions of the first data; and a distinguishing unit configured to distinguish whether the first data is normal data or abnormal data by a semi-supervised anomaly detection, based on the first data and the second data.

According to an embodiment of the present invention, it is possible to distinguish data with high precision, by using the semi-supervised anomaly detection method.

BRIEF DESCRIPTION OF DRAWINGS

FIG. 5 is a diagram to illustrate an example of a learning method by stacked auto-encoders;

FIG. 6 is a flowchart of an example of a distinguishing process according to the first embodiment;

FIG. 7 is a diagram of an example of a distinguished result according to the first embodiment;

DETAILED DESCRIPTION OF THE PREFERRED EMBODIMENTS

In the following, embodiments of the present invention will be described with reference to the drawings.

[First Embodiment]

Figure 1:
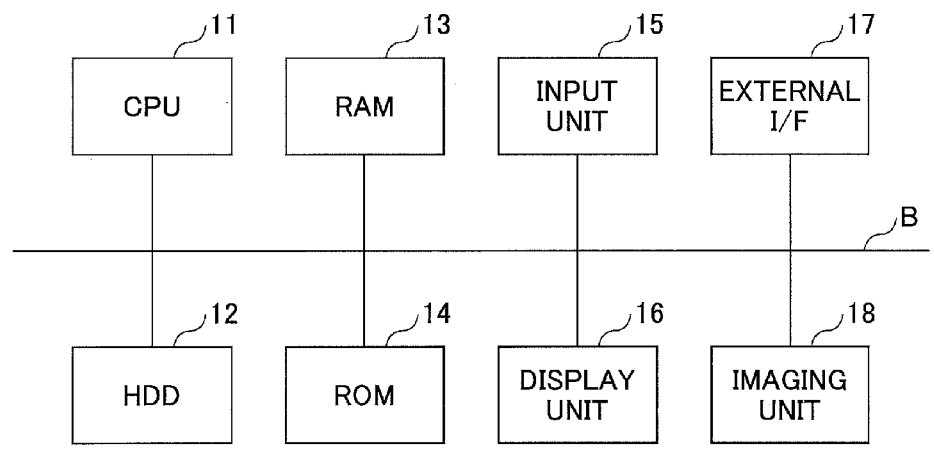
FIG. 1 is a hardware configuration diagram of an example of an information processing apparatus according to a first embodiment.

First, a hardware configuration of an information processing apparatus 10 will be described according to the first embodiment. FIG. 1 is a hardware configuration diagram of an example of the information processing apparatus 10 according to the first embodiment.

As illustrated in FIG. 1, the information processing apparatus 10 includes a CPU (Central Processing Unit) 11, an HDD (Hard Disk Drive) 12, a RAM (Random Access Memory) 13, a ROM (Read-Only Memory) 14, an input unit 15, a display unit 16, an external I/F 17, and an imaging unit 18, which are connected with each other via a bus B.

The CPU 11 is a processor that implements control and functions of the information processing apparatus 10 as a whole, by loading a program and data on the RAM 13 from the ROM 14 and the HDD 12, and executing a process.

The HDD 12 is a non-volatile memory to store programs and data. Programs and data stored in the HDD 12 include programs to implement the present embodiment, an OS (Operating System), which is basic software to control the information processing apparatus 10 as a whole, and application software running on the OS to provide various functions. The HDD 12 manages the stored programs and data by a prescribed file system, DBs (databases), and the like. Note that the information processing apparatus 10 may include an SSD (Solid State Drive) instead of the HDD 12, or along with HDD 12.

The RAM 13 is a volatile semiconductor memory (storage device) that temporarily stores programs and data. The ROM 14 is a non-volatile semiconductor memory (storage device) that can store programs and data even when the power is turned off.

The input unit 15 is a unit used for inputting various operational signals by a user. The input unit 15 includes, for example, various operational buttons, a touch panel, a keyboard, and a mouse.

The display unit 16 is a unit to display a processed result by the information processing apparatus 10. The display unit 16 is, for example, a display device.

The external I/F 17 is an interface to an external medium. An external medium may be, for example, a USB (Universal Serial Bus) memory, an SD card, a CD, or a DVD.

The imaging unit 18 is a unit to generate multidimensional data such as image data by capturing an image. The imaging unit 18 is, for example, a spectroscopic camera to obtain multiple sets of spectroscopic information of an object by imaging operations.

Here, multidimensional data is data that can be represented as multidimensional vector data. For example, image data of 640×480 pixels is multidimensional data that can be represented as multidimensional vector data of 640×480 dimensions, or 307200 dimensions in total. Similarly, for example, spectroscopic information of 31 wavelengths obtained from light irradiated on an object by light sources of prescribed six angles is multidimensional data that can be represented as multidimensional vector data of 6×31 dimensions or 186 dimensions in total. Further, not limited to these, multidimensional data includes various types of electronic data such as sound data, document data and the like. In the following, it will be described assuming that multidimensional data is represented as multidimensional vector data.

In the present embodiment, learning (a semi-supervised learning) is executed in advance on the information processing apparatus 10 by using multiple sets of multidimensional data classified as a normal model (namely, positive data), to distinguish whether multidimensional data taken as input is positive data.

Note that although the information processing apparatus 10 is configured to include the imaging unit 18 in FIG. 1, it is not limited to that, but the information processing apparatus 10 may be connected with the imaging unit 18, for example, via a network such as a LAN (Local Area Network) or the Internet to communicate with each other. Also, the information processing apparatus 10 may be connected with the imaging unit 18, for example, via an USB cable to communicate with each other. Namely, the present embodiment is also applicable to an information processing system that includes the information processing apparatus 10 and the imaging unit 18.

Further, the information processing apparatus 10 or the information processing system does not necessarily include the imaging unit 18, but the information processing apparatus 10 or the information processing system may be configured to include various devices (for example, a microphone) that generates multidimensional data described above. Also, the information processing apparatus 10 or the information processing system may be configured to take as input multidimensional data that is stored in, for example, an external medium via the external I/F 17, or from the HDD 12.

By having the hardware configuration above, the information processing apparatus 10 according to the present embodiment can implement various processes, which will be described later.

<Software Configuration>

Figure 2:
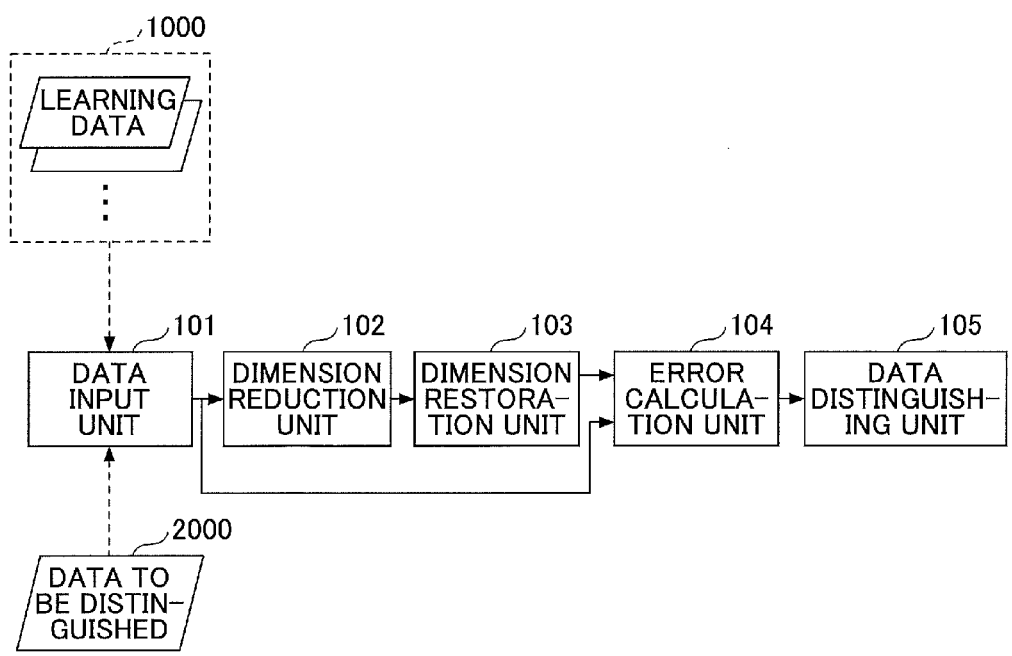
FIG. 2 is a process block diagram of an example of an information processing apparatus according to the first embodiment.

Next, a software configuration of the information processing apparatus 10 will be described according to the first embodiment. FIG. 2 is a process block diagram of an example of the information processing apparatus 10 according to the first embodiment.

As illustrated in FIG. 2, the information processing apparatus 10 includes a data input unit 101, a dimension reduction unit 102, a dimension restoration unit 103, an error calculation unit 104, and a data distinguishing unit 105.

The data input unit 101 is implemented by, for example, the CPU 11 and the like to take multidimensional data as input. The data input unit 101 takes as input learning data 1000, for example, via the external I/F 17, or from the HDD 12. Also, the data input unit 101 takes as input data to be distinguished 2000 that is generated by, for example, the imaging unit 18.

Here, the learning data 1000 is multiple sets of multidimensional data classified as a normal model (namely, positive data) used for having the dimension reduction unit 102, the dimension restoration unit 103, and the data distinguishing unit 105 learned, which will be described later. For example, if having the data distinguishing unit 105 distinguish whether an object in image data is a person or other than that, the learning data 1000 is image data having a person captured. Also, for example, if having the data distinguishing unit 105 distinguish whether paint quality (a colorimetry result) of a certain product satisfies prescribed standards, the learning data 1000 is spectroscopic information obtained from paint having quality that satisfies the prescribed standards. Note that in the following, if multiple sets of learning data 1000 need to be identified, respectively, they may be denoted as "learning data $1000_1$", "learning data $1000_2$", and so on.

On the other hand, the data to be distinguished 2000 is data to be distinguished by the data distinguishing unit 105. Namely, the data to be distinguished 2000 is determined (distinguished) to be data that represents an abnormal value (abnormal value data), or data that represents a normal value (normal value data). Here, stating that the data to be distinguished 2000 is abnormal value data means, for example, if image data having a person captured is assumed as normal value data, image data having an object other than a person (for example, a dog) captured is abnormal value data. Also, for example, if spectroscopic information obtained from paint of a certain product satisfying prescribed standards, is assumed as normal value data, spectroscopic information not satisfying the prescribed standards is abnormal value data.

Note that as described above, the learning data 1000 may be stored in an external medium, for example, a USB memory, an SD card, a CD, or a DVD, to be input into the information processing apparatus 10 via the external I/F 17, or may be stored in the HDD 12. Also, the data to be distinguished 2000 may be, for example, generated by an imaging operation of the imaging unit 18, or may be stored in the external medium to be input into the information processing apparatus 10 via the external I/F 17.

The dimension reduction unit 102 is implemented by, for example, the CPU 11 and the like, to reduce the number of dimensions of multidimensional data taken as input. Namely, from the multidimensional data taken as input, the dimension reduction unit 102 generates a characteristic vector that represents a characteristic of the multidimensional data, and has the number of dimensions less than that of the multidimensional data. Note that the dimension reduction unit 102 may adopt a method, for example, the stacked auto-encoders, which is a type of a multi-layer neural network, the principal component analysis (PCA), or the like.

The dimension restoration unit 103 is implemented by, for example, the CPU 11 and the like, to restore the original number of dimensions of the multidimensional data having the number of dimensions reduced by the dimension reduction unit 102. Namely, from the characteristic vector that has been generated by the dimension reduction unit 102, the dimension restoration unit 103 generates multidimensional data that has the number of dimensions restored to be that of the original multidimensional data. Note that similar to the dimension reduction unit 102, the dimension restoration unit 103 may adopt a method, for example, the stacked auto-encoders, which is a type of a multi-layer neural network, the principal component analysis (PCA), or the like.

The error calculation unit 104 is implemented by, for example, the CPU 11 and the like, to calculate an error amount that is generated by applying the dimension reduction to the multidimensional data taken as input, by the dimension reduction unit 102. Namely, the error calculation unit 104 calculates an error amount by calculating a difference between the multidimensional data taken as input, and the multidimensional data having the dimensions restored by the dimension restoration unit 103.

The data distinguishing unit 105 is implemented by, for example, the CPU 11 and the like, to distinguish the data to be distinguished 2000, by using a method of the semi-supervised anomaly detection. Namely, based on a model or the like learned in advance based on the learning data 1000, the data distinguishing unit 105 distinguishes (determines) whether the data to be distinguished 2000 is abnormal value data. Note that as a method of the semi-supervised anomaly detection used by the data distinguishing unit 105, for example, the LOF (Local Outlier Factor), which is a density-based outlier detection method, or the one-class SVM, which is an outlier detection method having an modified evaluation function of the SVM (Support Vector Machine), can be used.

Note that it is necessary to have the dimension reduction unit 102, the dimension restoration unit 103, and the data distinguishing unit 105 learned in advance, by using the learning data 1000 as will be described later.

<Details of Processes>

Next, processes of the information processing apparatus 10 according to the present embodiment will be described in detail. The information processing apparatus 10 according to the present embodiment needs to have the dimension reduction unit 102, the dimension restoration unit 103, and the data distinguishing unit 105 learned in advance by using the learning data 1000. Then, the information processing apparatus 10 according to the present embodiment distinguishes the data to be distinguished 2000, by the dimension reduction unit 102, the dimension restoration unit 103, and the data distinguishing unit 105 that have learned.

<<Learning Process>>

Figure 3:
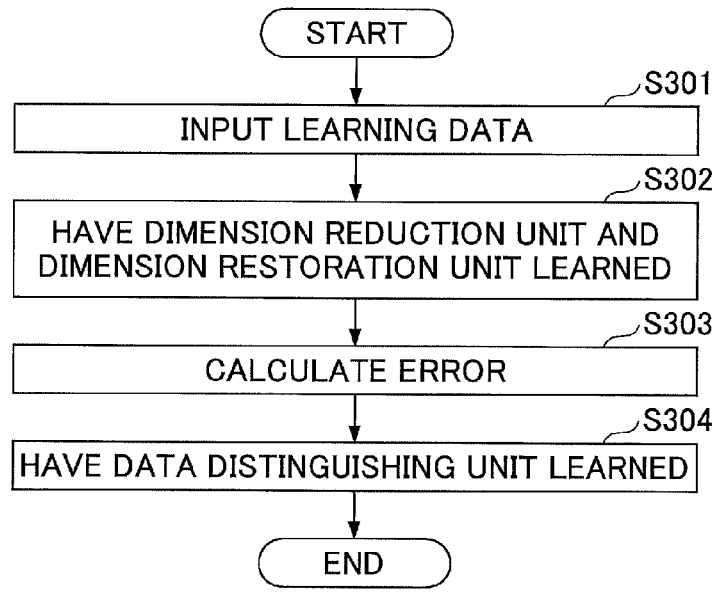
FIG. 3 is a flowchart of an example of a learning process according to the first embodiment.

First, a process will be described that is to have the dimension reduction unit 102, the dimension restoration unit 103, and the data distinguishing unit 105 learned, by using the learning data 1000, on the information processing apparatus 10 according to the present embodiment. FIG. 3 is a flowchart of an example of the learning process according to the first embodiment. Note that as described above, the learning data 1000 is multiple sets of multidimensional data classified as a normal model (namely, normal value data or positive data). Namely, the learning process described below is a semi-supervised learning process.

At Step S301, the data input unit 101 takes as input the learning data 1000. Note that the data input unit 101 takes as input the learning data 1000 from an external medium, for example, a USB memory, an SD card, a CD, or a DVD via the external I/F 17, or from the HDD 12 or the like. Also, the data input unit 101 may take as input the learning data 1000 via a network, for example, a LAN or the Internet, or may generate the learning data 1000 by an imaging operation of the imaging unit 18 to input the data.

At Step S302, the dimension reduction unit 102 and the dimension restoration unit 103 learn by using the input learning data 1000. Note that as examples here, two cases will be described about implementation of the dimension reduction unit 102 and the dimension restoration unit 103: a case of using a method of the principal component analysis; and another case of using a method of the stacked auto-encoders. However, the implementation of the dimension reduction unit 102 and the dimension restoration unit 103 is not limited to these two cases, but they can be implemented by any method among various dimension reduction and dimension restoration methods.

(Principal Component Analysis)

First, the case will be described where the dimension reduction unit 102 and the dimension restoration unit 103 are implemented by using a method of the principal component analysis. In this case, learning of the dimension reduction unit 102 and the dimension restoration unit 103 corresponds to obtaining eigenvectors that correspond to respective principal components, based on the input learning data 1000. In the following, it will be described assuming that the learning data 1000 is 30 sets of 100-dimensional vector data. Also, it is assumed that the dimension reduction unit 102 reduces 100-dimensional vector data to 25-dimensional vector data. However, the number of dimensions after the dimension reduction by the dimension reduction unit 102 is a matter of a design; it is not limited to 25 dimensions, but the number of dimensions may be determined discretionally. The same is applied to the case of using a method of the stacked auto-encoders.

In this case, $y^1$ to $y^{30}$ represent the learning data $1000_1$ to $1000_{30}$, respectively, as follows.

$$y^1 = (y_1^1, y_2^1, \ldots, y_{100}^1) \quad \text{(Formula 1)}$$
$$y^2 = (y_1^2, y_2^2, \ldots, y_{100}^2)$$
$$\vdots$$
$$y^{30} = (y_1^{30}, y_2^{30}, \ldots, y_{100}^{30})$$

Here, Y is defined as follows.

$$Y = \begin{pmatrix} y^1 \\ y^2 \\ \vdots \\ y^{30} \end{pmatrix} = \begin{pmatrix} y_1^1, y_2^1, \ldots, y_{100}^1 \\ y_1^2, y_2^2, \ldots, y_{100}^2 \\ \vdots \\ y_1^{30}, y_2^{30}, \ldots, y_{100}^{30} \end{pmatrix} \quad \text{(Formula 2)}$$

Then, the variance-covariance matrix A of Y is calculated by the following formula.

$$A = \text{cov}(Y) \quad \text{(Formula 3)}$$

Next, by solving an eigenvalue equation below, eigenvalues $\lambda$ are obtained. Here, I is an identity matrix.

$$\det(\lambda I - A) = 0 \quad \text{(Formula 4)}$$

Next, for each eigenvalue λ, an eigenvector x is obtained that satisfies the following relationship.

$$Ax = \lambda x \quad \text{(Formula 5)}$$

Here, an eigenvalue λ having the greatest value among the eigenvalues λ obtained by Formula 4 is the first principal component. Therefore, this is represented by $\lambda_1$, and the eigenvector obtained for this $\lambda_1$ by Formula 5 is represented by $x^1$.

Similarly, an eigenvalue λ having the second greatest value among the eigenvalues λ obtained by Formula 4 is the second principal component. Therefore, this is represented by $\lambda_2$, and the eigenvector obtained for this $\lambda_2$ by Formula 5 is represented by $x^2$.

For the rest of eigenvalues, eigenvectors $x^3$ to $x^{25}$ can be obtained similarly. The eigenvectors $x^1$ to $x^{25}$ obtained here are stored, for example, in the HDD 12 or the like (namely, the number of stored eigenvectors is the same as the number of dimensions after reduced by the dimension reduction unit 102). Thus, the dimension reduction unit 102 and the dimension restoration unit 103 has learned by using the learning data 1000. Note that in a process (distinguishing process) that will be described later, dimension reduction and dimension restoration are executed using the eigenvectors $x^1$ to $x^{25}$ obtained here.

(Stacked Auto-Encoders)

Next, the other case will be described where the dimension reduction unit 102 and the dimension restoration unit 103 are implemented by using a method of the stacked auto-encoders, which is a type of the multi-layer neural network. In this case, learning of the dimension reduction unit 102 and the dimension restoration unit 103 corresponds to adjusting network coefficients (also referred to as "weights") of layers of the stacked auto-encoders, based on the input learning data 1000. Note that these network coefficient are examples of a prescribed parameter.

Note that the stacked auto-encoders are a neural network having a multi-layer configuration of stacked neural networks called auto-encoders. Note that an auto-encoder is a neural network configured to have the same number of neurons (the number of units) on the input layer and the output layer, and a less number of neurons (the number of units) on an intermediate layer (hidden layer) than that of the input layer (or the output layer).

Figure 4:
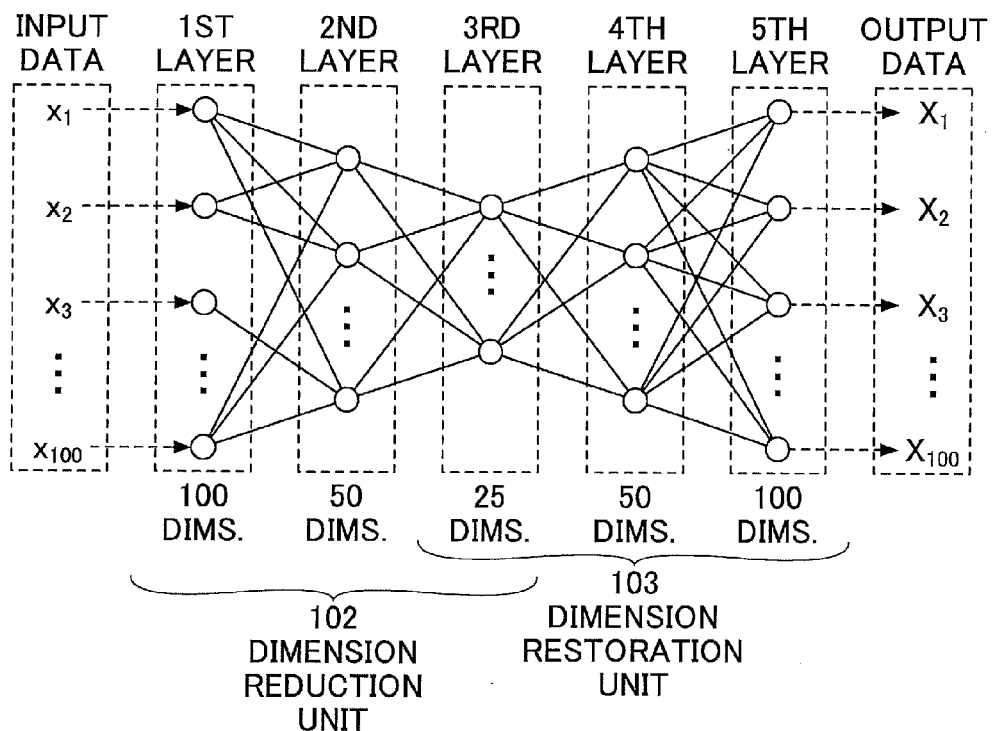
FIG. 4 is a diagram to illustrate an example of stacked auto-encoders.

In the following, it will be described assuming that the dimension reduction unit 102 and the dimension restoration unit 103 are implemented by stacked auto-encoders configured to have five layers as illustrated in FIG. 4. Namely, the dimension reduction unit 102 applies dimension reduction to 100-dimensional vector data taken as input, to obtain 50-dimensional vector data, and then, further reduces the 50-dimensional vector data to 25-dimensional vector data. On the other hand, the dimension restoration unit 103 applies dimension restoration to 25-dimensional vector data taken as input, to obtain 50-dimensional vector data, and then, further restores the 50-dimensional vector data to 100-dimensional vector data. Learning of the stacked auto-encoders illustrated in FIG. 4 will be described using FIG. 5. Here, it is assumed that the learning data 1000 is represented by Formula 1 as in the case of the principal component analysis.

Learning of the stacked auto-encoders is executed on each of the auto-encoders constituting the stacked auto-encoders. Therefore, the stacked auto-encoders illustrated in FIG. 4 executes learning on a first auto-encoder and a second auto-encoder constituting the stacked auto-encoders (Steps S1 and S2 in FIG. 5). Then, finally, learning called "fine-training" is executed (Step S3 in FIG. 5).

Step S1) First, learning is executed on the first auto-encoder constituting the stacked auto-encoders in FIG. 4, by using the learning data 1000. Namely, learning is executed by using the learning data 1000, on the first auto-encoder that has the first layer (input layer) whose number of neurons is 100, the second layer (the intermediate layer or the hidden layer) whose number of neurons is 50, and the third layer (output layer) whose number of neurons is 100.

This learning may be executed by a back propagation method (backpropagation) where $y^i$ is used as input data and teacher data of the first auto-encoder, for each i (i=1 to 30). Namely, by using the learning data 1000, network coefficients are adjusted by the back propagation method, to make the input data is equivalent to the output data on the first auto-encoder.

Step S2) Next, learning is executed on the second auto-encoder constituting the stacked auto-encoders in FIG. 4, by using data input into the second layer (the intermediate layer or the hidden layer) of the first auto-encoder.

Here, the data input into the second auto-encoder is represented by Formula 6 below where, for example, to $w_{1,j}$ to $w_{100,j}$ represent network coefficients between neurons on the input layer (the first layer) and a j-th neuron on the second layer counting from the top, respectively, on the first auto-encoder.

$$z^i = (z_1^i, z_2^i, \ldots, z_{50}^i) = \left( \sum_{k=1}^{100} w_{k,1} y_k^i, \sum_{k=1}^{100} w_{k,2} y_k^i, \ldots, \sum_{k=1}^{100} w_{k,50} y_k^i \right) \quad \text{(Formula 6)}$$

Therefore, the learning may be executed by the back propagation method (backpropagation) where $z^i$ is used as input data and teacher data on the second auto-encoder, for each i (i=1 to 30). Namely, by using the 30 sets of 50-dimensional vector data $z^i$, network coefficients are adjusted by the back propagation method, to make the input data of the second auto-encoder is equivalent to the output data.

Step S3) After the learning has been executed on all of the auto-encoders constituting the stacked auto-encoders, learning called "fine-training (or fine-tuning)" is executed. The fine-training is to execute learning on the stacked auto-encoders constituted by the all auto-encoders having learned, by using the learning data 1000. Namely, the learning may be executed by the back propagation method where $y^i$ is used as input data and teacher data of the stacked auto-encoders, for each i (i=1 to 30). Namely, by using the learning data 1000, network coefficients are adjusted by the back propagation method, to make the input data is equivalent to the output data on the stacked auto-encoders.

By executing this fine-training at the end, the network coefficients of the stacked auto-encoders are finely adjusted, and the performance of the dimension reduction unit 102 and the dimension restoration unit 103 can be improved. Namely, in a distinguishing process which will be described later, distinguishing precision by the data distinguishing unit 105 can be improved for data to be distinguished 2000 taken as input.

Note that although the stacked auto-encoders taken as an example in the above description have five layers having 100, 50, 25, 50, and 100 neurons, respectively, but the numbers are not limited to these. The number of neurons of each layer, and the number of layers constituting the neural network of stacked auto-encoders are matters of a design, which may be determined discretionally.

However, it is preferable to execute dimension reduction by the dimension reduction unit 102, and dimension restoration by the dimension restoration unit 103, separately on multiple layers. For example, when reducing 100-dimensional vector data to 25-dimensional vector data as described above, the number of dimensions may be reduced by using stacked auto-encoders having three layers whose numbers of neurons are 100, 25, and 100, respectively. However, it is more preferable to reduce the number of dimensions on a greater number of layers (five layers in the above example).

At Step S303, the error calculation unit 104 calculates an error after the dimension reduction and dimension restoration have been executed with each set of the learning data 1000. Namely, each set of the learning data 1000 is input into the dimension reduction unit 102 and the dimension restoration unit 103 that have learned at Step S302. Then, the error calculation unit 104 calculates an error between each set of the learning data 1000 taken as input, and each set of the learning data 1000 having the dimension restoration applied.

For example, assume that each set of the learning data 1000 taken as input is represented by Formula 1. In this case, each $y^i$ is input into the dimension reduction unit 102 to have dimension reduction applied, and then, input into the dimension restoration unit 103 to have dimension restoration applied. By representing each result (output) by $Y^i$, the error calculation unit 104 calculates an error $\Delta^i$ by calculating a difference between $y^i$ and $Y^i$ for each i. Namely, the error calculation unit 104 calculates Formula 7 below for each i (i=1 to 30).

$$\Delta^i = y^i - Y^i = (y_1^i - Y_1^i, y_2^i - Y_2^i, \ldots, y_{100}^i - Y_{100}^i) \qquad \text{(Formula 7)}$$

Note that if the learning at Step S302 is executed appropriately on the dimension reduction unit 102 and the dimension restoration unit 103, $\Delta^i$ is virtually a zero vector. This implies that if the dimension restoration unit 103 applies dimension restoration to a characteristic vector, which is a result of dimension reduction applied to multidimensional data taken as input by the dimension reduction unit 102, then, the multidimensional data taken as input is restored virtually as it was.

At Step S304, the data distinguishing unit 105 executes learning by using the error $\Delta^i$ calculated at Step S303.

For example, if using the LOF as an outlier detection method, the data distinguishing unit 105 plots the error $\Delta^i$ in a multidimensional space (a 100-dimensional space in the above example), to generate a data set (a positive model) that represents positive data. Note that such a data set may be stored in, for example, the HDD 12.

Also, for example, if using the one-class SVM as an outlier detection method, the data distinguishing unit 105 plots the error $\Delta^i$ in a multidimensional space (a 100-dimensional space in the above example), to generate a data set (a positive model) that represents positive data. Then, the data distinguishing unit 105 calculates a prescribed plane (or a curved surface) that separates this data set from prescribed points in the multidimensional space.

By having the data distinguishing unit 105 learned in this way, in a distinguishing process, which will be described later, it is possible to distinguish whether the data to be distinguished 2000 is abnormal value data (an outlier) by using an outlier detection method such as the LOF or the one-class SVM.

<<Distinguishing Process>>

Next, a process to distinguish the data to be distinguished 2000 will be described that uses the dimension reduction unit 102, the dimension restoration unit 103, and the data distinguishing unit 105 having the learning process applied as described above. Note that distinguishing data to be distinguished 2000 is, as described above, to determine whether the data to be distinguished 2000 is abnormal value data. FIG. 6 is a flowchart of an example of the distinguishing process according to the first embodiment.

At Step S601, the data input unit 101 takes as input the data to be distinguished 2000. Note that the data input unit 101 may take as input the data to be distinguished 2000, for example, by an imaging operation of the imaging unit 18. Also, the data input unit 101 may take as input the data to be distinguished 2000 from an external medium, for example, a USB memory, an SD card, a CD, or a DVD via the external I/F 17, or from the HDD 12 or the like. Further, the data input unit 101 may take as input the data to be distinguished 2000 via a network, for example, a LAN or the Internet.

At Step S602, the dimension reduction unit 102 reduces the number of dimensions of the data to be distinguished 2000 taken as input, and generates a characteristic vector. Then, at Step S603, the dimension restoration unit 103 restores the number of dimensions of the characteristic vector to be equivalent to the number of dimensions of the data to be distinguished 2000. Note that as examples here, two cases will be described about implementation of the dimension reduction unit 102 and the dimension restoration unit 103: a case of using a method of the principal component analysis; and another case of using a method of the stacked auto-encoders. However, the implementation of the dimension reduction unit 102 and the dimension restoration unit 103 is not limited to these two cases, but they can be implemented by any method among various dimension reduction and dimension restoration methods.

(Principal Component Analysis)

First, the case will be described where the dimension reduction unit 102 and the dimension restoration unit 103 are implemented by using a method of the principal component analysis. In the following, it will be described assuming that the data to be distinguished 2000 is 100-dimensional vector data. Also, it is assumed that the dimension reduction unit 102 reduces 100-dimensional vector data to 25-dimensional vector data.

In this case, "a" represents the data to be distinguished 2000 as follows.

$$a = (a_1, a_2, \ldots, a_{100}) \qquad \text{(Formula 8)}$$

Also, eigenvectors $x^1$ to $x^{25}$ having been stored in advance in the HDD 12 or the like by the learning process, are represented as follows.

$$x^1 = (x_1^1, x_2^1, \ldots, x_{100}^1) \qquad \text{(Formula 9)}$$
$$x^2 = (x_1^2, x_2^2, \ldots, x_{100}^2)$$
$$\vdots$$
$$x^{25} = (x_1^{25}, x_2^{25}, \ldots, x_{100}^{25})$$

Then, Formula 10 below is calculated for each j. Namely, correlation calculation is executed for the data to be distinguished 2000 and each of the eigenvectors $x^1$ to $x^{25}$.

$$\lambda_j = \sum_{i=1}^{100} a_i x_i^j \qquad \text{(Formula 10)}$$

Multidimensional data $\lambda=(\lambda_1, \lambda_2, \ldots, \lambda_{25})$ obtained in this way is a characteristic vector. Namely, the multidimensional data $\lambda$ is a vector obtained by applying dimension reduction to the data to be distinguished 2000 to have 25 dimensions by the dimension reduction unit 102.

Next, using the characteristic vector $\lambda$ obtained as above, Formula 11 below is calculated for each j.

$$A_j = \sum_{i=1}^{25} \lambda_i x_j^i \quad \text{(Formula 11)}$$

Multidimensional data $A=(A_1, A_2, \ldots, A_{100})$ obtained in this way is multidimensional data after the dimension restoration. Namely, the multidimensional data A is multidimensional data obtained by applying dimension restoration to the characteristic vector $\lambda$ to have 100 dimensions by the dimension restoration unit 103.

As described above, the dimension reduction unit 102 and the dimension restoration unit 103 execute dimension reduction and dimension restoration of the data to be distinguished 2000, by using a method of the principal component analysis.

(Stacked Auto-Encoders)

Next, the other case will be described where the dimension reduction unit 102 and the dimension restoration unit 103 are implemented by using a method of the stacked auto-encoders, which is a type of the multi-layer neural network. Here, it is assumed that the data to be distinguished 2000 is represented by Formula 8 as in the case of the principal component analysis.

In this case, multidimensional data $a=(a_1, a_2, \ldots, a_{100})$ representing the data to be distinguished 2000 is input into the first layer (input layer) of the stacked auto-encoders illustrated in FIG. 4 that has learned in advance in the learning process. Then, the multidimensional data $A=(A_1, A_2, \ldots, A_{100})$ can be obtained that is the output data having the dimension reduction and dimension restoration applied by the stacked auto-encoders. Namely, by inputting the multidimensional data "a" into the stacked auto-encoders illustrated in FIG. 4, the dimension is reduced to 50 dimensions, and further to 25 dimensions, by the dimension reduction unit 102. The 25-dimensional multidimensional data obtained in this way is the characteristic vector $\lambda$. Then, the dimension of the characteristic vector $\lambda$ is restored to have 50 dimensions, and further to have 100 dimensions by the dimension restoration unit 103, to obtain the multidimensional data A.

As described above, the dimension reduction unit 102 and the dimension restoration unit 103 execute dimension reduction and dimension restoration of the data to be distinguished 2000 by using a method of the stacked auto-encoders, which is a type of the multi-layer neural network.

At Step S604, the error calculation unit 104 calculates an error of the data to be distinguished 2000 after having the dimension reduction and dimension restoration applied. Namely, the error calculation unit 104 takes as input the multidimensional data A obtained at Step S602 and S603, and the multidimensional data "a" representing the data to be distinguished 2000, and then, calculates a difference between "a" and A to calculate the error $\Delta$. Namely, the error calculation unit 104 calculates the error $\Delta$ by Formula 12 below.

$$\Delta = a - A = (a_1 - A_1, a_2 - A_2, \ldots, a_{100} - A_{100}) \quad \text{(Formula 12)}$$

Note that this formula implies that $\Delta$ is virtually a zero vector if the data to be distinguished 2000 is positive data (normal value data). On the other hand, the formula also implies that a constant C exists with which $\Delta$ satisfies $|\Delta|>C$ if the data to be distinguished 2000 is negative data (abnormal value data). Thus, at next Step S605, the data to be distinguished 2000 can be distinguished by the data distinguishing unit 105.

At Step S605, the data distinguishing unit 105 distinguishes the data to be distinguished 2000 by using the error $\Delta$ calculated at Step S604.

For example, if using the LOF as an outlier detection method, the data distinguishing unit 105 plots the error $\Delta$ in the multidimensional space in which the data set representing the positive model has been plotted in advance by the learning process. Then, the data distinguishing unit 105 calculates an LOF value (LOF score) based on a density of points around the plotted point of the error $\Delta$, and if the calculated LOF score is greater than or equal to a prescribed reference value, the data distinguishing unit 105 determines that the data to be distinguished 2000 is abnormal value data. Note that the prescribed reference value is a value that has been set in advance by a user or the like.

Also, for example, if using the one-class SVM as an outlier detection method, the data distinguishing unit 105 plots the error $\Delta$ in the multidimensional space in which the data set representing the positive model has been plotted in advance by the learning process. Then, the data distinguishing unit 105 determines whether the data to be distinguished 2000 is abnormal value data, depending on which one of the subspaces of the multidimensional space separated by the prescribed plane (or the curved surface) obtained in the learning process, includes the value of the prescribed function (evaluation function) taking the error $\Delta$ as input. Namely, the data distinguishing unit 105 distinguishes that the data to be distinguished 2000 is abnormal value data if the value of the prescribed function taking the error $\Delta$ as input is included in one of the multidimensional subspaces that includes the prescribed points. On the other hand, the data distinguishing unit 105 distinguishes that the data to be distinguished 2000 is normal value data if the value of the prescribed function taking the error $\Delta$ as input is included in the other of the multidimensional subspaces that includes the data set representing the positive data.

In this way, the data distinguishing unit 105 can distinguish whether the data to be distinguished 2000 is abnormal value data or normal value data.

Here, an example of a distinguished result by the information processing apparatus 10 will be described according to the present embodiment. FIG. 7 is a diagram of an example of a distinguished result according to the first embodiment. FIG. 7 illustrates error rates (erroneous detection rates) obtained by respective abnormal data detectors of (1) a conventional distinguisher that uses the one-class SVM as an outlier detection method, (2) a conventional distinguisher that uses the LOF as an outlier detection method, and (3) the information processing apparatus 10 according to the present embodiment, respectively. Note that the dimension reduction unit 102 and the dimension restoration unit 103 of the information processing apparatus 10 designated by (3), use stacked auto-encoders constituted with seven layers whose numbers of neurons are, counting from the first layer, 186, 100, 50, 25, 50, 100, and 186, respectively.

For each of the abnormal data detectors (1) to (3) in FIG. 7, learning is executed by using the same positive data, and then, the error rate is measured when distinguishing multiple sets of multidimensional data having 186 dimensions as data to be distinguished. Consequently, as illustrated in FIG. 7, the information processing apparatus 10 according to the present embodiment exhibits an error rate that is lower than those of (1) and (2) based on the conventional methods. This implies that the information processing apparatus 10 is very effective as an abnormal data detector.

[Second Embodiment]

Next, the information processing apparatus 10 will be described according to a second embodiment. The information processing apparatus 10 according to the second embodiment does not have an error calculation unit 104, which is different from that of the first embodiment. Note that in the following, the parts having the same functions or executing the same processes as in the first embodiment are assigned the same codes, and their description is omitted.

<Software Configuration>

Figure 8:
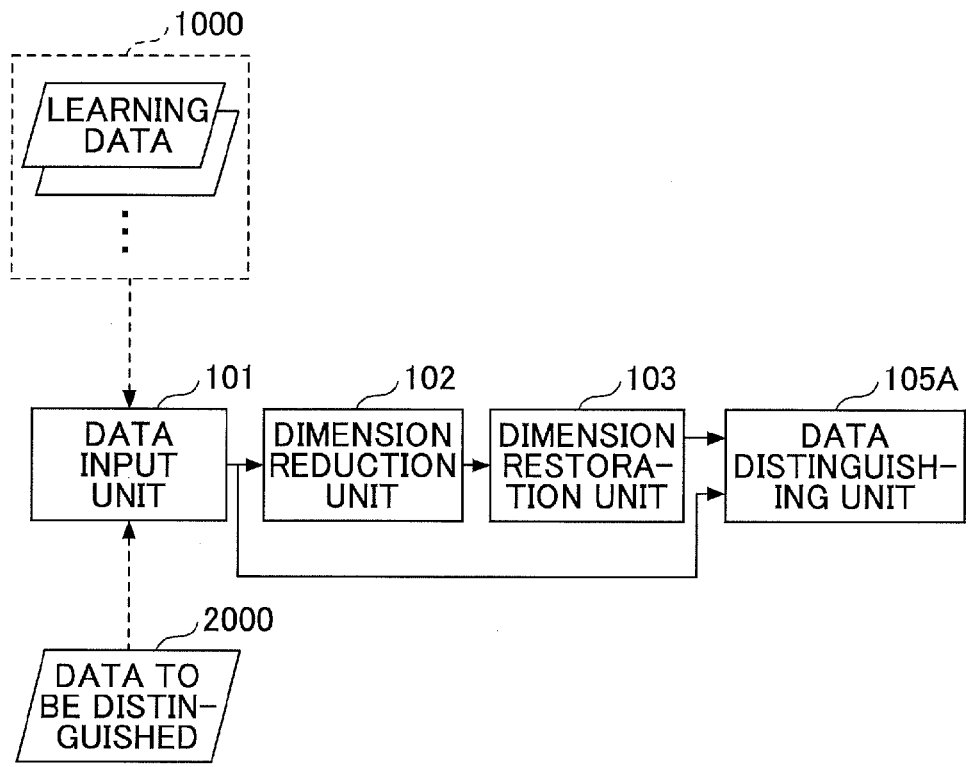
FIG. 8 is a process block diagram of an example of an information processing apparatus according to a second embodiment.

First, a software configuration of the information processing apparatus 10 will be described according to the second embodiment. FIG. 8 is a process block diagram of an example of the information processing apparatus 10 according to the second embodiment.

As illustrated in FIG. 8, the information processing apparatus 10 according to the second embodiment differs from the first embodiment in that an error calculation unit 104 is not included, and a data distinguishing unit 105A has a different function.

The data distinguishing unit 105A distinguishes data to be distinguished 2000. However, the data distinguishing unit 105A of the information processing apparatus 10 according to the second embodiment executes learning, based on learning data 1000, and multidimensional data obtained by applying dimension reduction and dimension restoration to the learning data 1000. Also, the data distinguishing unit 105A of the information processing apparatus 10 according to the second embodiment distinguishes data, based on data to be distinguished 2000, and multidimensional data obtained by applying dimension reduction and dimension restoration to the data to be distinguished 2000.

<Details of Processes>

Next, processes of the information processing apparatus 10 according to the present embodiment will be described in detail.

<<Learning Process>>

Figure 9:
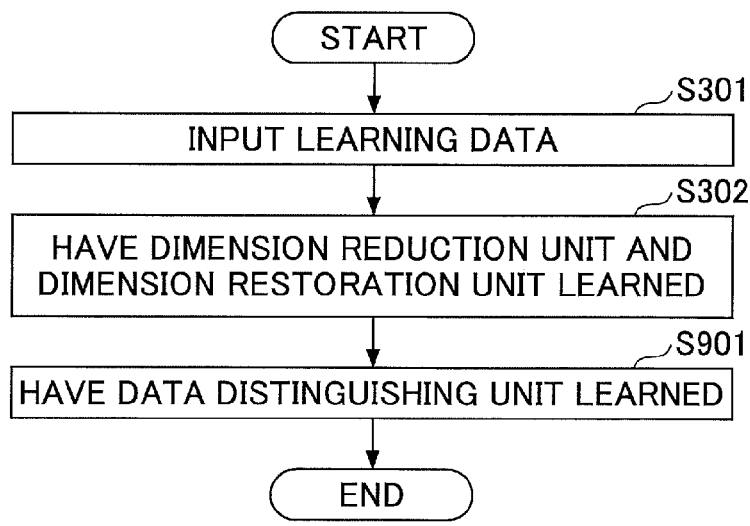
FIG. 9 is a flowchart of an example of a learning process according to the second embodiment.

First, a process will be described that is to have the dimension reduction unit 102, the dimension restoration unit 103, and the data distinguishing unit 105A learned, by using the learning data 1000, on the information processing apparatus 10 according to the present embodiment. FIG. 9 is a flowchart of an example of the learning process according to the second embodiment. Step S901 of the learning process according to the second embodiment differs from the first embodiment. Therefore, Step S901 will be described in the following.

At Step S901, the data distinguishing unit 105A executes learning by using respective sets of multidimensional data $y^i$ representing respective sets of the learning data 1000, and results (output) $Y^i$ obtained by inputting respective $y^i$ into the dimension reduction unit 102 and the dimension restoration unit 103 having learned at Step S302.

For example, if using the LOF as an outlier detection method, the data distinguishing unit 105A plots multidimensional data ($y^i$, $Y^i$) having 200 dimensions in a multidimensional space (it is a 200-dimensional space because both $y^i$ and $Y^i$ have 100 dimensions in the above example) for each i, to generate a data set (a positive model) that represents positive data. Note that such a data set may be stored in, for example, the HDD 12.

Also, for example, if using the one-class SVM as an outlier detection method, the data distinguishing unit 105A plots multidimensional data ($y^i$, $Y^i$) having 200 dimensions in a multidimensional space (it is a 200-dimensional space because both $y^i$ and $Y^i$ have 100 dimensions in the above example) for each i, to generate a data set (a positive model) that represents positive data. Then, the data distinguishing unit 105A calculates a prescribed plane (or a curved surface) that separates this data set from prescribed points in the multidimensional space.

<<Distinguishing Process>>

Figure 10:
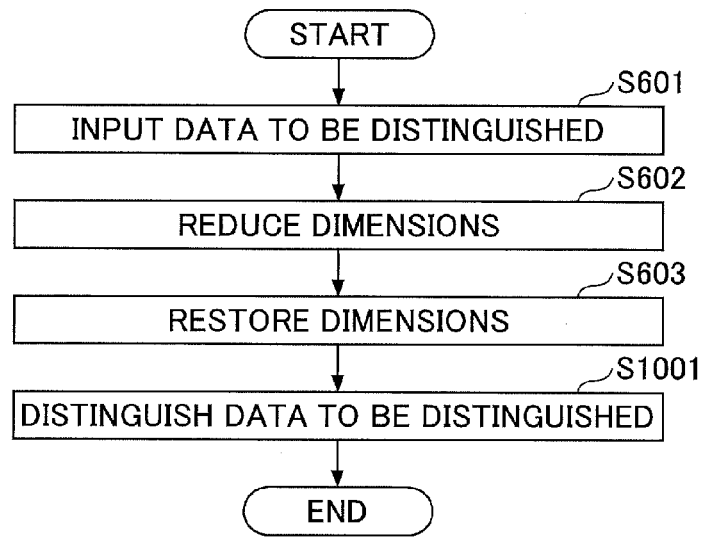
FIG. 10 is a flowchart of an example of a distinguishing process according to the second embodiment.

Next, a process to distinguish the data to be distinguished 2000 will be described that uses the dimension reduction unit 102, the dimension restoration unit 103, and the data distinguishing unit 105A having the learning process applied as described above. FIG. 10 is a flowchart of an example of the distinguishing process according to the second embodiment. Step S1001 of the learning process according to the second embodiment differs from the first embodiment. Therefore, Step S1001 will be described in the following.

At Step S1001, the data distinguishing unit 105A distinguishes the data to be distinguished 2000, by using the multidimensional data "a" representing the data to be distinguished 2000, and the multidimensional data A obtained at Step S602 and S603.

For example, if using the LOF as an outlier detection method, the data distinguishing unit 105A plots multidimensional data (a, A) having 200 dimensions in the multidimensional space (namely, a 200-dimensional space) in which the data set representing the positive model has been plotted in advance by the learning process. Then, the data distinguishing unit 105A calculates an LOF value (LOF score) based on a density of points around the plotted point of the multidimensional data (a, A), and determines whether the calculated LOF score is greater than or equal to a prescribed reference value.

Also, for example, if using the one-class SVM as an outlier detection method, the data distinguishing unit 105A plots the multidimensional data (a, A) having 200 dimensions in the multidimensional space in which the data set representing the positive model has been plotted in advance by the learning process. Then, the data distinguishing unit 105A determines whether the data to be distinguished 2000 is abnormal value data, depending on which one of the subspaces of the multidimensional space separated by the prescribed plane (or the curved surface) obtained in the learning process, includes the value of the prescribed function (evaluation function) taking the multidimensional data (a, A) as input.

[Third Embodiment]

Next, an information processing apparatus 10 will be described according to a third embodiment. The information processing apparatus 10 according to the third embodiment does not have a dimension restoration unit 103, which is different from that of the second embodiment. Note that in the following, the parts having the same functions or executing the same processes as in the second embodiment are assigned the same codes, and their description is omitted.

<Software Configuration>

Figure 11:
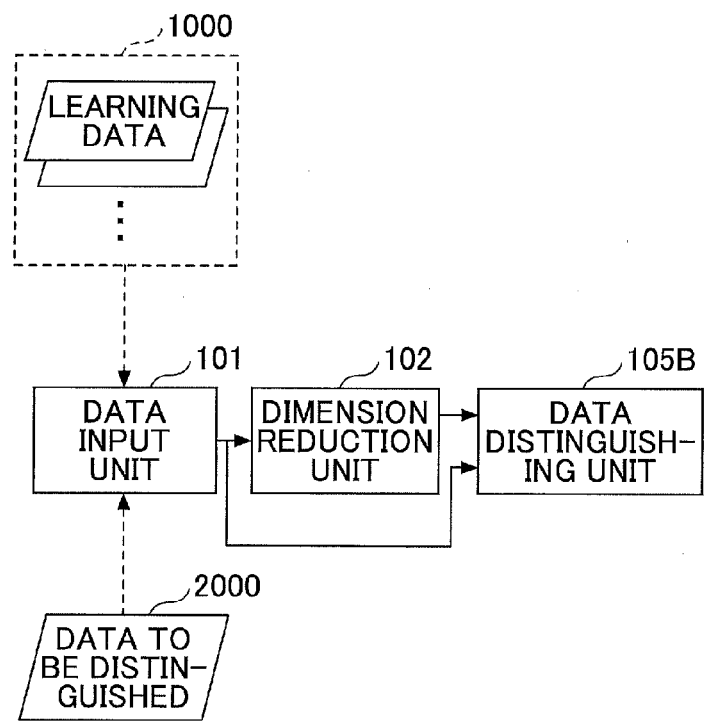
FIG. 11 is a process block diagram of an example of an information processing apparatus according to a third embodiment.

First, a software configuration of the information processing apparatus 10 will be described according to the third embodiment. FIG. 11 is a process block diagram of an example of the information processing apparatus 10 according to the third embodiment.

The data distinguishing unit 105B distinguishes data to be distinguished 2000. However, the data distinguishing unit 105B of the information processing apparatus 10 according to the third embodiment executes learning, based on learning data 1000, and multidimensional data obtained by applying dimension reduction to the learning data 1000. Also, the data distinguishing unit 105B of the information processing apparatus 10 according to the third embodiment distinguishes data, based on data to be distinguished 2000, and multidimensional data obtained by applying dimension reduction to the data to be distinguished 2000.

<Details of Processes>

Next, processes of the information processing apparatus 10 according to the present embodiment will be described in detail.

<<Learning Process>>

Figure 12:
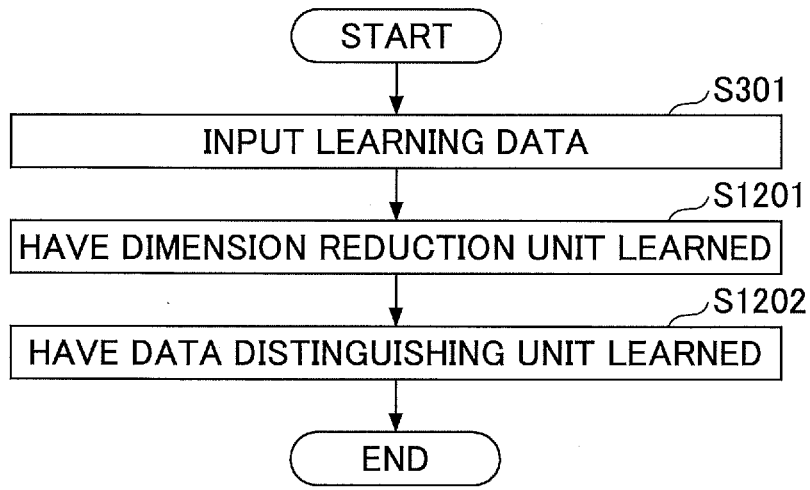
FIG. 12 is a flowchart of an example of a learning process according to the third embodiment.

First, a process will be described that is to have the dimension reduction unit 102 and the data distinguishing unit 105B learned, by using the learning data 1000, on the information processing apparatus 10 according to the present embodiment. FIG. 12 is a flowchart of an example of the learning process according to the third embodiment. Steps S1201 and S1202 of the learning process according to the third embodiment differ from the second embodiment. Therefore, Steps S1201 and S1202 will be described in the following.

At Step S1201, the dimension reduction unit 102 executes learning by using the learning data 1000 taken as input. This may be done by executing substantially the same learning as described for Step S302 in FIG. 3, and a learned result of the dimension restoration unit 103 may be discarded. For example, if executing learning on the stacked auto-encoders illustrated in FIG. 4, the multi-layer neural network constituted with the first layer to the third layer is taken out to be used as the dimension reduction unit 102.

At Step S1202, the data distinguishing unit 105B executes learning by using respective sets of multidimensional data $y^i$ representing respective sets the learning data 1000, and results (output) $\lambda^i$ obtained by inputting respective $y^i$ into the dimension reduction unit 102 having learned at Step S1201. Note that $\lambda^i$ is the characteristic vector of each $y^i$.

For example, if using the LOF as an outlier detection method, the data distinguishing unit 105B plots multidimensional data ($y^i$, $\lambda^i$) having 125 dimensions in a multidimensional space (it is a 125-dimensional space because $y^i$ has 100 dimensions and $\lambda^i$ has 25 dimensions in the above example) for each i, to generate a data set (a positive model) that represents positive data. Note that such a data set may be stored in, for example, the HDD 12.

Also, for example, if using the one-class SVM as an outlier detection method, the data distinguishing unit 105B plots multidimensional data ($y^i$, $\lambda^i$) having 125 dimensions in a multidimensional space (it is a 125-dimensional space because $y^i$ has 100 dimensions and $\lambda^i$ has 25 dimensions in the above example) for each i, to generate a data set (a positive model) that represents positive data. Then, the data distinguishing unit 105B calculates a prescribed plane (or a curved surface) that separates this data set from prescribed points in the multidimensional space.

<<Distinguishing Process>>

Figure 13:
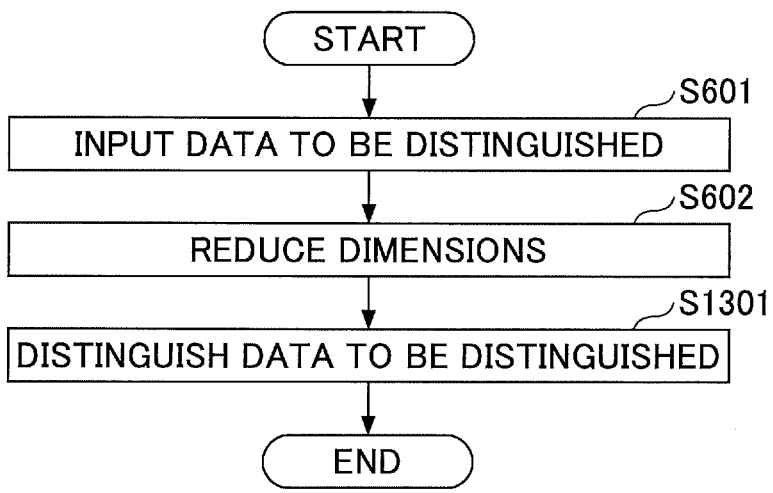
FIG. 13 is a flowchart of an example of a distinguishing process according to the third embodiment.

Next, a process to distinguish the data to be distinguished 2000 will be described that uses the dimension reduction unit 102 and the data distinguishing unit 105B having the learning process applied as described above. FIG. 13 is a flowchart of an example of the distinguishing process according to the third embodiment. Step S1301 of the learning process according to the third embodiment differs from the second embodiment. Therefore, Step S1301 will be described in the following.

At Step S1301, the data distinguishing unit 105B distinguishes the data to be distinguished 2000, by using the multidimensional data "a" representing the data to be distinguished 2000, and the characteristic vector λ obtained at Step S602.

For example, if using the LOF as an outlier detection method, the data distinguishing unit 105B plots multidimensional data (a, λ) in the multidimensional space (namely, a 125-dimensional space) in which the data set representing the positive model has been plotted in advance by the learning process. Then, the data distinguishing unit 105B calculates an LOF value (LOF score) based on a density of points around the plotted point of the multidimensional data (a, λ), and determines whether the calculated LOF score is greater than or equal to a prescribed reference value.

Also, for example, if using the one-class SVM as an outlier detection method, the data distinguishing unit 105B plots multidimensional data (a, λ) in the multidimensional space in which the data set representing the positive model has been plotted in advance by the learning process. Then, the data distinguishing unit 105 determines whether the data to be distinguished 2000 is abnormal value data, depending on which one of the subspaces of the multidimensional space separated by the prescribed plane (or the curved surface) obtained in the learning process, includes the value of the prescribed function (evaluation function) taking the multidimensional data (a, λ) as input.

<Overview>

As described above, the information processing apparatus 10 according to the first embodiment can execute anomaly detection with high precision by using an error between input data and a result obtained by executing dimension reduction and dimension restoration by the dimension reduction unit 102 and the dimension restoration unit 103 having learned by normal value data in advance.

Also, the information processing apparatus 10 according to the second embodiment omits the error calculation unit 104, to have a simplified configuration of the information processing apparatus 10, yet to be capable of executing anomaly detection with high precision.

Also, the information processing apparatus 10 according to the third embodiment further omits the dimension restoration unit 103 to have an even more simplified configuration of the information processing apparatus 10, yet to be capable of executing anomaly detection with high precision.

Note that the data input unit 101 is an example of a data input unit. The dimension reduction unit 102 is an example of a dimension reduction unit. The dimension restoration unit 103 is an example of a dimension restoration unit. The error calculation unit 104 is an example of an error calculation unit. The data distinguishing unit 105 is an example of a distinguishing unit.

The present invention is not limited to the embodiments specifically disclosed above, but various modifications and improvements can be made within the scope of the present invention.

RELATED-ART DOCUMENTS

Patent Documents

[Patent Document 1] Japanese Laid-open Patent Publication No. 2014-26455

This application is based upon and claims the benefit of priority of the prior Japanese Priority Application No. 2014-219946 filed on Oct. 29, 2014, the entire contents of which are hereby incorporated by reference.

What is claimed is:

1. An information processing system, including one or more information processing apparatuses, the system comprising:
a camera configured to generate multidimensional data by capturing an image;
a processor configured to:
input the multidimensional data as first data;
generate, based on the first data, second data representing a characteristic of the first data, the second data having a prescribed number of dimensions fewer than a number of dimensions of the first data, said processor being configured to generate the second data by reducing the number of dimensions of the first data at multiple layers; and
distinguish whether the first data is normal data or abnormal data by a semi-supervised anomaly detection, based on the first data and the second data, said normal data being defined as belonging to a plurality of learning data of a predetermined model and said abnormal data being defined as not belonging to the plurality of learning data of the predetermined model,
generate, based on the second data, third data having a number of dimensions being equivalent to the number of the dimensions of the first data;
wherein the processor is configured to distinguish whether the first data is normal data or abnormal data by the semi-supervised anomaly detection, based on the first data and the third data,
wherein the processor is configured to use a neural network or a principal component analysis,
wherein a dimension reduction by the processor is improved by adjusting each network coefficient of the neural network or the principal component analysis, by using a back propagation method so that output data becomes the same as input data, and
wherein the processor uses a Local Outlier Factor.

2. The information processing system, as claimed in claim 1, the processor is further configured to:
calculate error data representing an error induced by the processor, by calculating a difference between the first data and the third data,
wherein the processor is further configured to distinguish whether the first data is normal data or abnormal data, by the semi-supervised anomaly detection based on the error data.

3. The information processing system, as claimed in claim 1, wherein the processor uses a neural network or a principal component analysis.

4. The information processing system, as claimed in claim 1, wherein the neural network is stacked auto-encoders.

5. The information processing system, as claimed in claim 1, wherein the neural network learns in advance a prescribed parameter, by using one or more sets of normal data.

6. The information processing system, as claimed in claim 1, wherein the camera includes a spectroscopic camera.

7. The information processing system, as claimed in claim 1, wherein the multiple layers include three layers.

8. The information processing system, as claimed in claim 1, wherein the processor is configured to calculate the Local Outlier Factor value based on a density of points around plotted point of a difference between the first data and the third data and determine whether the first data is normal data or abnormal data by comparing the calculated Local Outlier Factor value with a predetermined value.

9. The information processing system, as claimed in claim 1, wherein the neural network is stacked auto-encoders including seven layers.

10. The information processing system, as claimed in claim 9, wherein the seven layers have numbers of neurons of 186, 100, 50, 25, 50, 100 and 186, respectively.

11. An information processing apparatus, taking as input first data being multidimensional, the apparatus comprising:
a camera configured to generate multidimensional data by capturing an image, said multidimensional data being input as the first data ;
a processor configured to:
generate, based on the first data, second data representing a characteristic of the first data, the second data having a prescribed number of dimensions fewer than a number of dimensions of the first data, said processor being configured to generate the second data by reducing the number of dimensions of the first data at multiple layers; and
distinguish whether the first data is normal data or abnormal data by a semi-supervised anomaly detection, based on the first data and the second data, said normal data being defined as belonging to a plurality of learning data of a predetermined model and said abnormal data being defined as not belonging to the plurality of learning data of the predetermined model,
generate, based on the second data, third data having a number of dimensions being equivalent to the number of the dimensions of the first data;
wherein the processor is configured to distinguish whether the first data is normal data or abnormal data by the semi-supervised anomaly detection, based on the first data and the third data,
wherein the processor is configured to use a neural network or a principal component analysis,
wherein a dimension reduction by the processor is improved by adjusting each network coefficient of the neural network or the principal component analysis by using a back propagation method so that output data becomes the same as input data, and
wherein the processor uses a Local Outlier Factor.

12. An information processing method, executed on an information processing apparatus taking as input first data being multidimensional, the method comprising:
generating, by an image unit, multidimensional data by capturing an image;
inputting the multidimensional data as the first data;
generating, based on the first data, second data representing a characteristic of the first data, the second data having a prescribed number of dimensions fewer than a number of dimensions of the first data, said second data being generated by reducing the number of dimensions of the first data at multiple layers; and
distinguishing whether the first data is normal data or abnormal data by a semi-supervised anomaly detection, based on the first data and the second data, said normal data being defined as belonging to a plurality of learning data of a predetermined model and said abnormal data being defined as not belonging to the plurality of learning data of the predetermined model,
generating, based on the second data, third data having a number of dimensions being equivalent to the number of the dimensions of the first data;
wherein the distinguishing distinguishes whether the first data is normal data or abnormal data by the semi-supervised anomaly detection, based on the first data and the third data, wherein the information processing method uses a neural network or a principal component analysis, wherein a dimension reduction is improved by adjusting each network coefficient of the neural network or the principal component analysis by using a back propagation method so that output data becomes the same as input data, and wherein the distinguishing is performed by using a Local Outlier Factor.

* * * * *